Sept 17, 1957 W. C. LAMPHIER 2,806,985
ELECTRICAL CAPACITORS
Filed May 11, 1954
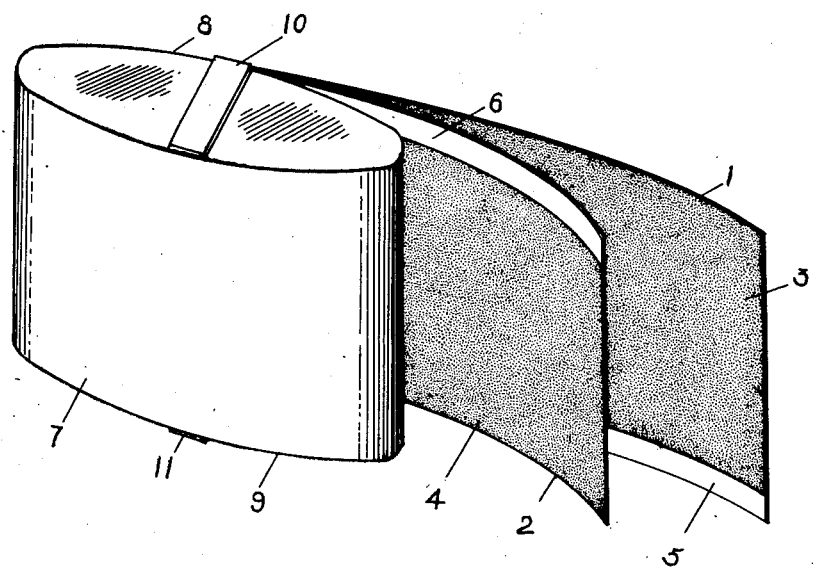
INVENTOR.
WALTER C. LAMPHIER
BY
Connolly and Hutz
HIS ATTORNEYS

United States Patent Office 2,806,985
Patented Sept. 17, 1957

2,806,985
ELECTRICAL CAPACITORS

Walter C. Lamphier, Williamstown, Mass., assignor to Sprague Electric Company, North Adams, Mass., a corporation of Massachusetts Application May 11, 1954, Serial No. 428,928

4 Claims. (Cl. 317—258)

This invention relates to miniature capacitors capable of operating at elevated temperatures and more particularly to metallized capacitors of high capacity per unit volume using a complex dielectric system.

The metallized dielectric capacitor, particularly the metallized paper capacitor which is impregnated after assembly, has become well-known particularly in view of its extremely high capacitance per unit volume and its unique property of self-healing. This self-sealing phenomenon allows a metallized capacitor on operational voltage to volatilize away areas of its electrodes adjacent to conducting particles incorporated within, or electrically defective segments of, the dielectric so as to avoid failure of the device. Metallized paper capacitors, in particular, are not satisfactory for operational temperatures in excess of 100° C. without severe derating as they rapidly fail. There are dielectrics other than paper which can function for long periods at temperatures of from 100 to 125° C. but they too have numerous shortcomings. Many dielectric films available have extreme variation of electrical characteristics as received from the manufacturer, making it impossible to fabricate high quality units. Other types of resinous films, if susceptible to metallization (which many are not), often suffer substantial injury during the self-healing action from the resulting decomposition products, materially decreasing operational life at elevated temperatures.

It is an object of this invention to overcome the foregoing and related disadvantages. It is a further object of this invention to produce an electrical capacitor satisfactory for extended operational use at temperatures of 100° C. to 125° C. or higher. It is a still further object of this invention to produce a self-healing capacitor of extremely high capacity per unit volume, operable for extended periods at temperatures up to 125° C., and which has an extremely high insulation resistance. Further objects of this invention will become apparent from the following specification and appended claims.

These objects have been achieved in accordance with this invention by the production of a capacitor having a capacitive section comprising electrodes separated by a dielectric material, said dielectric material being alternate layers of a non-porous film and a porous spacer, one of the electrodes being positioned between said non-porous film and said porous spacer, and said capacitive section being fully impregnated with a polyhydrocarbon.

In a more restricted sense the preferred embodiment of my invention is a capacitor comprising a metallized lacquered paper and a metallized polyethylene terephthalate film fully impregnated with a polyhydrocarbon.

As indicated above, this invention features the use of a complex dielectric system, for in my preferred embodiment alternate layers of lacquered paper and polyethylene terephthalate film are used. A capacitor using such a system has been found to exhibit remarkable electrical properties, particularly in insulation resistance and length of life when operated at temperatures up to 125° C.

The reason for this is not fully understood as the insulation resistance for metallized paper at 125° C. is in the order of 8 megohm microfarads while the insulation resistance of non-metallized polyethylene terephthalate is in the order of 200 megohm microfarads at 125° C., whereas the combination of metallized lacquered paper and metallized polyethylene terephthalate exhibit not the expected 7½ to 8 megohm microfarads insulation resistance but an insulation resistance in the order of 40 megohm microfarads, an increase of 500% over what one would predict. Accompanying this much improved insulation resistance is extended operational life compared with the metallized lacquered all-paper unit. Perhaps the unusual properties of the metallized lacquered paper-metallized polyethylene terephthalate capacitors are associated with the fact that one metal layer is between the lacquer and the polyethylene terephthalate and the other on the latter so that voids in the region adjacent to the metallized layer are eliminated. The porous spacer offers a medium for impregnation of the assembly so that all the undesired properties associated with the presence of voids within capacitors are eliminated. The broad concept of this invention is not limited to a metallized unit, as I have discovered that the use of such complex dielectric systems in capacitors yield units of high caliber. Thus the electrodes can be either of the standard foil type including aluminum, tin, zinc, lead or the metallized electrode produced by conventional and well-known techniques which includes the deposits of aluminum, lead or tin, with zinc preferred.

With the deposition of the metallized layers upon a porous dielectric it is essential that an intermediate stratum of lacquer be positioned upon the surface of the porous spacer so as to keep the metallic particles from penetrating into the porous dielectric. Among those lacquer resins which can be positioned on the surface of the porous spacer are included cellulose acetate sorbate, cellulose acetate butyrate, cellulose nitrate, and so forth.

Although kraft paper forms a part of my preferred system, numerous other porous dielectric spacers can be used, and they include linen paper, both calendered and supercalendered kraft paper, glass woven or pulped from the fiber state to produce a cloth or matte-like spacer, cross-linked nylon of both a woven and nonwoven variety, regenerated cellulose, cross-linked cellulose acetate, polytetrahaloethylenes including polytetrafluoroethylene and polymonochlorotrifluoroethylene, silica and mica papers, porous polyethylene terephthalate and combinations of the above.

The other dielectric which is combined with the porous spacer to form the complex dielectric for my capacitor is a nonporous film. It must be able to withstand high dielectric stress without failure, have a softening temperature above the maximum operational temperature, and preferably a reasonably high dielectric constant.

Although polyethylene terephthalate film is the preferred material and its properties establish a measure of the desired characteristics, numerous other resinous films fall within the broad scope of the invention. Examples of other suitable non-porous dielectric films include polytetrahaloethylenes as polytetrafluoroethylene and polytrifluoromonochloroethylene, cross-linked polystyrene, and cross-linked copolymers predominating in polystyrene, cross-linked polyethylene (cross-linking produced by high energy particle bombardment), polybutadiene and other similar high melting point conjugated polydienes, copolymers of butadiene-styrene, organo-boron resins, the polymer of perfluoroaceto nitrile, a polymer derived from phosphonitrilic chloride, and also any of the foregoing resins with fillers such as talc, titanium dioxide, mica, glass flakelets, glass fibers, asbestos, etc.

To obtain the unique properties of my invention it is necessary to impregnate the assembly with a polyhydrocarbon which includes substituted derivatives thereof. Mineral waxes such as the micro-crystalline high melting point waxes, polyisobutylene, the gel derivative of polyethylene and polyisobutylene, and mineral oil constitute those impregnants which operate extremely well with the invention. Included within the broad scope of this invention, however, are such impregnants as the cross-linked hydrocarbon polymers, lanosterol, chlorinated and fluorinated hydrocarbon polymers, silicone oil, n-vinyl carbazole, polystyrene, polybutene, and others of similar nature.

Looking now at the drawing which portrays a partially unrolled capacitor prepared in accordance with the teachings of this invention, a non-porous sheet 1, and a lacquered porous sheet 2, each has a vapor deposited coating 3, 4 of a suitable metal, such as zinc, on one face. Margins 5, 6 extending the entire length of each of these sheets are left free from deposited metal. The two sheets are superimposed with their metallized surfaces each facing in the same direction with the metal-free margins on opposite sides and thereafter rolled longitudinally to produce the wound section 7. The thicknesses of the sheets 1 and 2 can be the same. Where desired for higher voltage applications when miniaturization is not as vital, one or more additional layers of non-metallized non-lacquered porous spacer can be used, applied against the non-lacquered side of the metallized porous film. Contact terminals 8, 9 are formed on opposite sides of the wound section 7 by spraying on a small block of low melting metal, such as lead-tin solder. After attachment of the leads 10 and 11 to the respective blocks of metal 8 and 9, the section is positioned within a suitable container, which container can be of metal, paper or thermoset resin. The units are thereafter fully impregnated and sealed either hermetically or non-hermetically, as required, by means well-known in the art. Units prepared in this fashion from metallized lacquered paper and metallized polyethylene terephthalate, operated without failure for 1000 hours at 125° at one and one-half times rated voltage. Their insulation resistance was in excess of 40 megohm microfarads. The above units were impregnated with a microcrystalline mineral wax having a softening point of about 195° F.

For certain applications the impregnant has added to it a small percentage of an inhibitor to prolong its operational life at elevated temperatures. Such an inhibitor is t-butyl anthraquinone although azobiphenyl, azobenzene, and anthraquinone are equally susceptible to use. A further embodiment of this invention is a foil type unit having a complex dielectric of porous polytetrafluoroethylene film and non-porous polyethylene terephthalate film. After assembly, this unit is impregnated with a cross-linked hydrocarbon polymer. For extended life the impregnant has two percent of t-butyl anthraquinone added.

As many apparently widely different embodiments of this invention may be made without departing from the spirit and scope hereof, it is to be understood that the invention is not limited to the specific embodiments hereof except as defined in the appended claims.

What is claimed is:

1. An electrical capacitor comprising two convolutely wound oppositely polarized electrode strata, one set of opposing faces thereof being separated by a substantially non-porous resin film and the other set of opposing faces thereof being separated by a lacquered porous cellulosic dielectric substantially completely impregnated with a hydrocarbon dielectric.

2. An electrical capacitor comprising two convolutely wound oppositely polarized electrode strata separated by two different dielectrics, one being a substantially non-porous plastic film wound on one side of one stratum and insulating one of its faces and the other dielectric being a hydrocarbon impregnated paper wound on the other side of said stratum and insulating its other face, the thickness of said plastic film and the thickness of said paper being substantially the same.

3. The electrical capacitor of claim 1 wherein one electrode stratum is a metallized layer on one face of said resin film and the other electrode stratum is a metallized metal film deposited upon the laquered surface of said porous dielectric.

4. The invention of claim 1 in which the resin is polyethylene terephthalate.

References Cited in the file of this patent

FOREIGN PATENTS

| | | |
|---|---|---|
| 876,274 | Germany | May 11, 1953 |
| 705,353 | Great Britain | Mar. 10, 1954 |